(12) United States Patent
Ikuta

(10) Patent No.: US 6,189,822 B1
(45) Date of Patent: Feb. 20, 2001

(54) DOUBLE BEARING REEL

(75) Inventor: Takeshi Ikuta, Sakai (JP)

(73) Assignee: Shimano Inc., Sakai (JP)

( * ) Notice: Under 35 U.S.C. 154(b), the term of this patent shall be extended for 0 days.

(21) Appl. No.: 09/536,046

(22) Filed: Mar. 27, 2000

(30) Foreign Application Priority Data

Mar. 30, 1999 (JP) .................................................. 11-089861

(51) Int. Cl.$^7$ .................................................. A01K 89/02
(52) U.S. Cl. .......................... 242/296; 242/257; 242/299; 242/306
(58) Field of Search ..................................... 242/286, 295, 242/296, 299, 302, 306, 307, 259, 257

(56) References Cited

U.S. PATENT DOCUMENTS

| | | | |
|---|---|---|---|
| 724,208 | * | 3/1903 | Rockwell .............................. 242/295 |
| 969,234 | * | 7/1910 | Wollensak ............................ 242/296 |
| 1,547,297 | * | 7/1925 | Case ..................................... 242/299 |
| 3,827,649 | * | 8/1974 | Payen ................................... 242/296 |
| 4,540,135 | * | 9/1985 | Uetsuki et al. ....................... 242/296 |
| 4,685,632 | * | 8/1987 | Yeh ....................................... 242/296 |
| 5,374,002 | * | 12/1994 | Sato ..................................... 242/306 |
| 5,556,050 | * | 9/1996 | Baisch et al. ........................ 242/296 |
| 5,947,398 | * | 9/1999 | Yeh ....................................... 242/295 |

FOREIGN PATENT DOCUMENTS

21131 * 1/1988 (GB) .................................. 242/296
2192322 * 1/1988 (GB) .................................. 242/296

* cited by examiner

*Primary Examiner*—Donald P. Walsh
*Assistant Examiner*—Emmanuel M. Marcelo
(74) *Attorney, Agent, or Firm*—Shinjyu Intellectual Property Firm (57) ABSTRACT

A double bearing reel that facilitates operating the braking and sounding mechanisms while fishing. A reel includes a reel body having a handle (2), a spool (15), a clutch mechanism (21), a frictional braking mechanism (26), a sounding mechanism (27), a switching operation mechanism (28), and a drag mechanism (42). The frictional braking mechanism is capable of braking the spool in its braking state regardless of the state of the clutch mechanism and switchable between the braking state and a non-braking state. The sounding mechanism is capable of producing sound in accordance with the rotation of the spool and switchable between an engaged state in which sound may be produced and a disengaged state in which no sound is produced. The switching operation mechanism is capable of switching, at the same time, the states of both the sounding mechanism and the first braking mechanism from the engaged state and the braking state, respectively, to the disengaged state and the non-braking state, respectively, or vice versa. The drag mechanism brakes the rotation of the spool in the line releasing direction while the clutch mechanism is turned on.

12 Claims, 7 Drawing Sheets

DOUBLE BEARING REEL

BACKGROUND OF THE INVENTION

1. Technical Field

The present invention relates to double bearing reels. More specifically, the invention relates to double bearing reels for attachment to fishing rods wherein fishing line is reeled in on an axis transverse to the fishing rod longitudinal direction.

2. Description of Related Art

In a double bearing reel, a fishing line is reeled in around an axis that crosses a longitudinal direction of a fishing rod. A double bearing reel includes a reel body, a handle, a spool, a rotation transmitting mechanism, a clutch mechanism, and a braking mechanism which is also referred to as a casting control mechanism. The reel body is attached to the fishing rod. The handle is rotatably disposed in the reel body. The spool, which is used for reeling in the fishing line, is rotatably supported on the reel body. The rotation transmitting mechanism transmits the rotation of the handle to the spool. The clutch mechanism is provided in the course of the rotation transmitting mechanism. The braking mechanism brakes the spool regardless of a state of the clutch mechanism.

With this sort of double bearing reel, one provided with a sounding mechanism is known which produces a sound, regardless of an on/off state of the clutch mechanism, when the spool is rotated, and is capable of being switched from an engaged state to a disengaged state or vice versa. With this kind of sounding mechanism, since its engaged state may be maintained during fishing and this engaged state may be switched to the disengaged state when casting or reeling in the fishing line, it is possible to inform a fisherman when a fish is caught by producing a sound or reduce a rotational resistance of the spool when casting or reeling in the fishing line.

It is convenient to use a reel provided with this type of sounding mechanism when drifting live bait. When live bait is used, a bait rig is cast so that it is placed at a predetermined depth of the water while the clutch mechanism is turned off and the sounding mechanism is disengaged. After the bait rig is cast, the casting control mechanism is set to be stronger than normal so that the live bait may swim freely but the fishing reel is not so much released. Then the sounding mechanism is switched to the engaged state, so as to produce a large sound when a fish is caught and the fishing line is released rapidly from the spool.

When a fish bites on the live bait and the fishing line reels out suddenly, rotating the spool and sounding the sounding mechanism, the clutch is put on to set in the tackle and hook the fish. After hooking the fish, to reduce resistance on the fishing line when reeling in, the sounding mechanism is disabled and the casting control mechanism is loosened. When running bait suited to comparatively big-game fishing, especially, the resistance in taking up the fishing line has to be reduced as much as possible, otherwise the reeling-in strain will increase. Rotating the handle in the line-winding direction then draws up the fish.

In a double bearing reel of the foregoing conventional configuration, when beginning to wait for a strike after the bait rig is cast, the sounding mechanism must be activated and at the same time braking force on the spool must be set stronger. When a fish is caught, the sounding mechanism must be deactivated and meanwhile the casting control mechanism loosened. The two operations therefore have to be carried out to respond to the fishing conditions, and particularly when a fish is caught and fishing line reeled in while landing the fish, performing the two complex operations is an involved task.

SUMMARY OF THE INVENTION

Accordingly, one of the objects of the present invention is to facilitate operation of a braking mechanism and a sounding mechanism in a double bearing reel during fishing.

A double bearing fishing reel according to one aspect of the present invention is for attachment to a fishing rod, in which a fishing line is reeled in around an axis that crosses a longitudinal direction of the fishing rod. The double bearing reel includes a reel body provided with a handle, the reel body to be attached to the fishing rod, a spool, a clutch mechanism, a first braking mechanism, a sounding mechanism, and a switching operation mechanism. The spool is rotatably supported in the reel body. The clutch mechanism is a mechanism switchable between a coupled state in which a rotation of the handle is transmitted to the spool and an uncoupled state in which the rotation of the handle is not transmitted to the spool. The first braking mechanism is a mechanism that is capable of braking the spool in its braking state regardless of the state of the clutch mechanism and switchable between the braking state and a non-braking state. The sounding mechanism is a mechanism that is capable of producing sound in accordance with the rotation of the spool and switchable between an engaged state in which sound may be produced and a disengaged state in which no sound is produced. The switching operation mechanism is a mechanism which is capable of switching, at the same time, the states of both the sounding mechanism and the first braking mechanism from the engaged state and the braking state, respectively, to the disengaged state and the non-braking state, respectively, or vice versa.

In this double bearing reel, when drifting live bait, the clutch mechanism is turned off and the braking mechanism and the sounding mechanism are switched to the non-braking state and the disengaged state, respectively, using the switching operation mechanism after the live bait rig is prepared. Thus, with the spool free to rotate, the rig may be quickly cast to a predetermined depth of water. After the rig is placed at the predetermined depth, the braking mechanism and the sounding mechanism are switched to the braking state and the engaged state, respectively, using the switching operation mechanism. In this state, the live bait may freely swim in the water, although the fishing line is restrained somewhat from winding out from the spool by a braking force is applied to the spool by the first braking mechanism. When a fish is caught, the spool is rapidly rotated in the line releasing direction and the sound indicator mechanism produces sound as a signal that the fish is caught. To hook the fish, the clutch mechanism is turned on and, using the switching operation mechanism, the first braking mechanism and the sounding mechanism are switched respectively to the non-braking state and the disengaged state, to reduce rotational resistance generated when reeling in the fishing line. Winding the spool in the reeling-in direction using the handle then lands the fish.

Herein, since the first braking mechanism and the sounding mechanism may be switched at the same time using the switching operation mechanism, reel switching operations necessary for fishing are simplified, as compared with reels in which the first braking mechanism and the sounding mechanism are operated separately.

A double bearing reel in a further aspect of the present invention is the foregoing double bearing reel, further including a braking adjustment mechanism for adjusting braking force applied to the spool. In this case, since the braking force applied to the spool may be adjusted, it is possible to change the braking force in accordance with the tugging force of the live bait.

A double bearing reel in a still further aspect is the foregoing double bearing reel, further including a second braking mechanism which applies a braking force to the spool to prevent the spool from rotating in the line releasing direction when the clutch mechanism is in the coupled state. Herein, by setting the braking force applied by the second braking mechanism weaker than that of the first braking force, the live bait may freely swim in the water while applying the weaker force to the spool using the second braking mechanism. Then, when a fish is caught, the clutch mechanism may be turned so that a larger braking force is applied to the spool by the second braking mechanism to help land the fish. Accordingly, using the two braking mechanisms having the different levels of braking force enables drifting live bait and landing fish without switching the braking force.

A double bearing reel in yet another aspect of the invention is the foregoing double bearing reel, wherein the first braking mechanism includes: a first rotation member rotatably disposed on the reel body; a pressing member for pressing the first rotation member; a second rotation member that rotates in cooperation with the spool; and a coupling member movable between a coupled position, in which the coupling member is coupled to the first rotation member and the second rotation member, and an uncoupled position, in which the coupling member is uncoupled from at least one of the first and second rotation members. The coupling member is therein for transmitting rotation of the second member to the first member when placed into the coupled position. The braking adjustment mechanism adjusts the pressing condition of the pressing member. The switching operation mechanism moves the coupling member between the coupled position and the uncoupled position.

Herein, when the coupling member is put into the coupled position, the sounding mechanism and the first braking mechanism are switched to the engaged state and the braking state, respectively. Then, when the spool rotates, the sounding mechanism is switched to the engaged state. At the same time, the rotation of the spool is transmitted to the first rotation member via the second rotation member and the coupling member, so that the pressing member presses on the first rotation member to brake the first rotation member, which in turn brakes the spool. Therein, the braking force applied is adjusted by the braking adjustment mechanism. Also, since the coupling member is disengaged from at least one of the first rotation member and the second rotation member when the coupling member is put into the uncoupled position, rotation of the second rotation member is not transmitted to the first rotation member and, hence, the spool is not braked. The sounding mechanism therein is also switched to the disengaged state. Accordingly, the configuration of structural parts is simplified because the braking state and the non-braking state are switched by the coupling and uncoupling of the coupling member with the two rotation members.

A double bearing reel in still another aspect of the present invention is the foregoing double bearing reel, wherein: the second rotation member is a gear non-rotatable fitted to the spool spindle; the first rotation member is a gear that turns on an axis parallel to the spindle; and the coupling member is a gear engagable with the two gears. Herein, constituting both the coupling member and the two rotation members as gears effects the braking state and the non-braking state securely.

A double bearing reel in a further aspect is the foregoing double bearing reel, wherein the braking adjustment mechanism includes an adjustment member rotatably fitted to the reel body, and a cam mechanism for contacting the pressing member. The cam mechanism rotates cooperatively with, and reciprocates along the rotational axis of, the adjustment member. The pressing member is disposed between the cam mechanism and the first rotation member. The reciprocating movement of the cam mechanism varies compressing force applied to the first rotation member by the pressing member. Herein, since the braking force is adjusted by the cam mechanism pressing on the pressing member in the rotational axis direction, the pressing force is restricted in comparison with a configuration in which the pressing member is compressed by screws. The braking adjustment mechanism is therefore less subject to damage.

A double bearing reel in yet another aspect is the foregoing double bearing reel, further including an urging means for urging the coupling member towards the coupled position. Herein, since the coupling member is urged towards the coupled position, the coupling member is securely coupled with the two rotational members though force in the uncoupling direction acts on the coupling member.

A double bearing reel in a still further aspect is the foregoing double bearing reel, wherein the sounding mechanism includes a disk-shaped jagged member having circumferentially spaced outer peripheral projections formed side by side. The jagged member rotates cooperatively with the spool. The sounding mechanism also includes a sounding member, disposed such that one is movable into a sounding position between the peripheral projections of the jagged member and into a separated position wherein the end is parted away from the peripheral projections. In the sounding position, rotation of the jagged member vibrates the sounding member. The switching operation mechanism moves the sounding member between the sounding position and the separated position. Herein, when the sounding member is put into the sounding position by the switching operation mechanism, the first braking mechanism is switched to the braking state. When the spool rotates in this state, the end of the sounding member vibrates by repeatedly colliding with the peripheral projections on the jagged member rotating cooperatively with the spool, producing a clicking sound. At the same time, the spool is braked. Further, when put into the separated position, the first braking mechanism is switched to the non-braking state and no sound is produced when the spool rotates, reducing rotational resistance on the spool. The sounding state and sound-disabled state are effected by the sounding member contacting/parting on/off the peripheral projections on the jagged member. Thus a simple mechanism reliably realizes the two states.

A double bearing reel in another aspect of the invention is the foregoing double bearing reel, wherein the jagged member is non-rotatably fitted to the spool spindle. Further, herein the switching operation mechanism includes: handling member which is movably provided on the reel body for moving the sounding member between the sounding position and the separated position; and a converting member including a rotative portion for rotatably supporting the coupling member, and a converter portion, formed integrally with the rotative portion, for converting movement of the handling member to rotation around the spindle. Moving the sounding member into the sounding position rotates the converting member and thus moves the coupling member into the coupled position. Moving the sounding member into the separated position rotates the converting member in reverse, thus moving the coupling member into the releasing position. Herein, when the handling member is used to move the sounding member into the sounding position, in the converting member the converter portion converts the movement to rotation of the rotative portion. The converting member thus turns into the coupled position. On the other hand, when the sounding member is moved into the separated position, the converting member turns into the uncoupled position. Accordingly, a simple structure switches the sounding mechanism and the first braking mechanism at the same time by the converter member turning.

A double bearing reel in still another aspect is the foregoing double bearing reel, wherein the sounding member is moveable radially with respect to the jagged member, and the handling member is provided on the reel body to be movable in the said radial direction. The handling member moves the sounding member from the sounding position to the separated position, the latter being shifted in the said radial direction from the former. Herein, making the sounding member movable using the handling member in the radial direction with respect to the jagged member simplifies the structure of the handling member.

A double bearing reel in yet a further aspect is the foregoing double bearing reel, wherein the sounding member is pivotably fitted to the handling member, and the urging member is a spring member for maintaining the sounding member in a predetermined position. Herein, when the sounding member makes collides repeatedly with the peripheral projections on the jagged member rotating cooperatively with the spool, the sounding member vibrates to produce sound, while maintained in the predetermined position by the spring member. The spring member indirectly urges the coupling member towards the coupled position via the handling member. Since the spring member both maintains the sounding member in the predetermined position and urges the coupling member towards the coupled position, only one spring member is required for purposes, which accordingly simplifies the structure.

The double bearing reel in one further aspect of the present invention is the foregoing double bearing reel, further including a regulating means for regulating rotational position of the converter member in the coupled position. Herein, regulating the coupling member from over-travel in the coupled position keeps rotational resistance generated when the fishing line is released from being large. Further, the rotational resistance not being large is thus not heavy on the operation of moving the handling member in shifting it into the parted away position.

The foregoing and other objects, features, aspects and advantages of the present invention will become more apparent from the following detailed description in conjunction with the accompanying drawings.

DETAILED DESCRIPTION OF THE PREFERRED EMBODIMENTS

Figure 1:
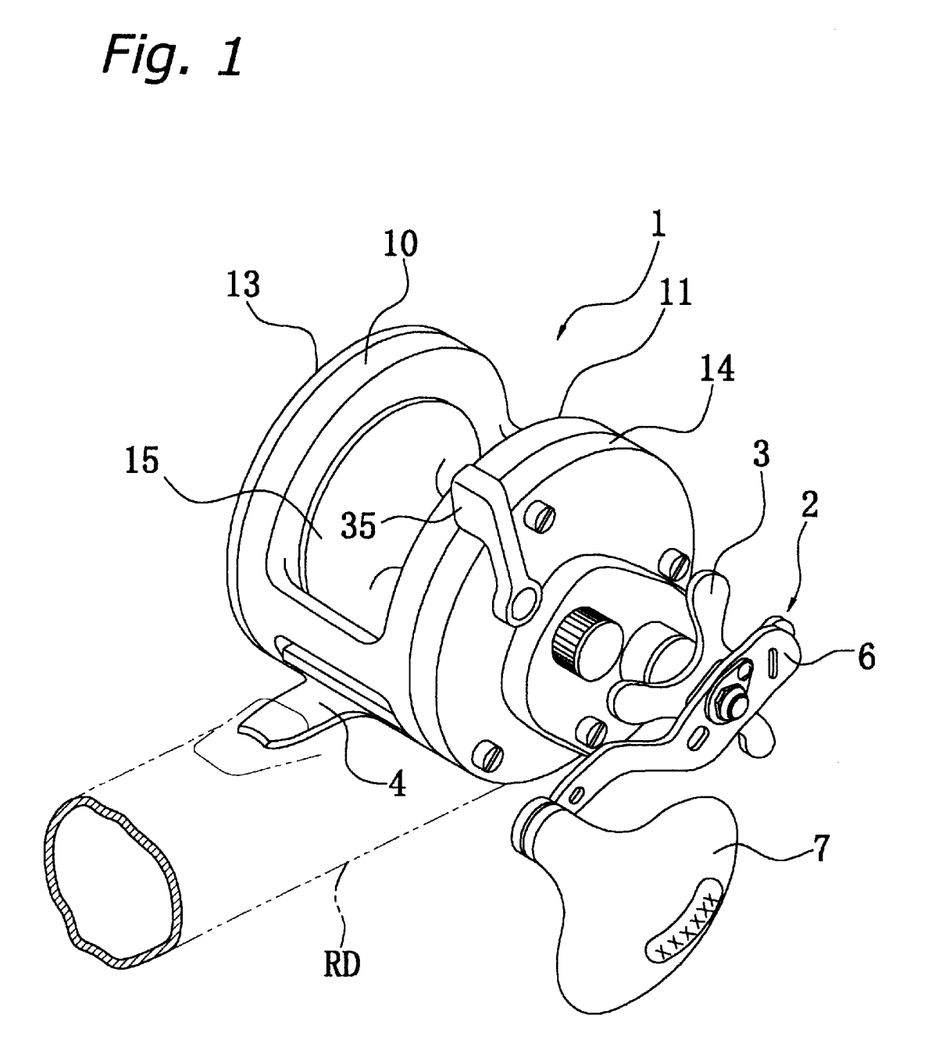
FIG. 1 is an oblique view of a double bearing reel to which an embodiment of the present invention is applied.

A double bearing reel according to one embodiment of the present invention is a mid-size round reel as shown in FIG. 1 that is suitable for a 300 meter fishing line of about 0.37 mm diameter (i.e., about 20-lb. test), for example. The reel includes a reel body 1, a handle assembly 2, and a star drag 3. The handle assembly 2 is provided for rotating a spool 15 and is disposed at one side of the reel body 1. The star drag 3 (which is one example of a handling member) is disposed at the reel body 1 side of the handle assembly 2. This double bearing reel is not provided with a level wind mechanism.

Figure 2:
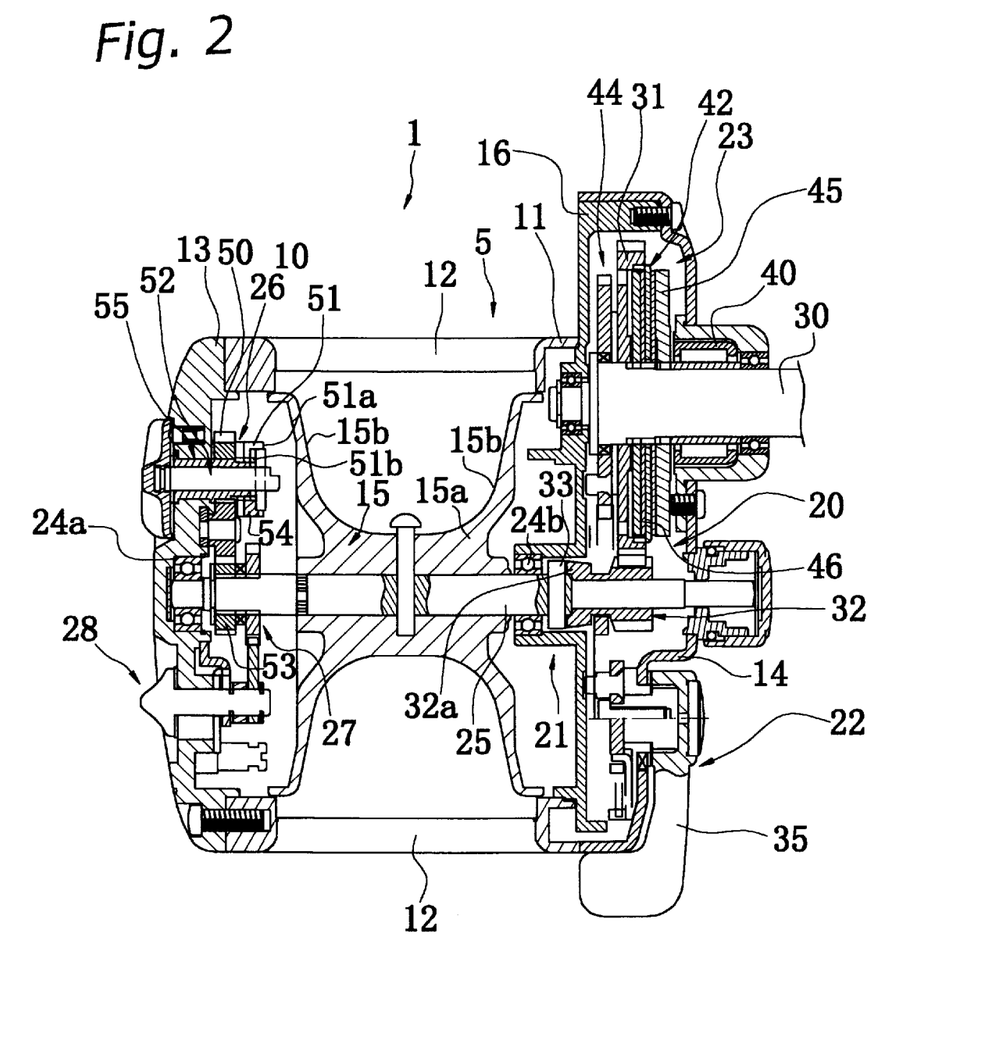
FIG. 2 is a section view of the double-bearing reel depicted in FIG. 1.

The spool 15 is provided rotatably on the reel body 1. The reel body 1 may be attached to a fishing rod RD via a fishing rod mount 4. As shown in FIG. 2, the reel body 1 includes a pair of right and left side plates 10 and 11, a reel frame 5, a first cover 13, a second cover 14, and a mechanism fitting plate 16. The pair of right and left side plates 10 and 11 is disposed at a predetermined spacing. The frame includes a plurality of connecting members 12 that connect the side plates 10 and 11. The first cover 13 and the second cover 14 are disposed on respective sides of the reel frame 5. The mechanism fitting plate 16 is attached to the second cover 14 in contact with the side plate 11. There is space between the mechanism fitting plate 16 and the second cover 14 to accommodate various mechanisms that will be described later.

The reel frame 5 may be produced by die-casting, and the second cover 14 may be produced by press-forming a thin metal plate. Viewed laterally each of the pair of side plates 10 and 11, and the first cover 13 are circular. The outer surfaces of the side plates 10 and 11, and of the first cover 13 are machined using, for instance, a lathe. Both the second cover 14 and the mechanism fitting plate 16 are circular, and viewed laterally protrude radially in part. A portion of the second cover 14, to which a handle shaft 30 (to be described later) is fitted, also protrudes outward axially.

The connecting members 12 are plate-shaped elements formed along the circumference of the two side plates 10 and 11 and unitarily with both side plates 10 and 11, connecting the side plates 10 and 11 into a pair in three places, for example, on the reel body 1—the rear, bottom and front. Forming the plurality of connecting members 12 integrally with the side plates 10 and 11, prevents drop in reeling-in efficiency by keeping the reel from deforming such as by bending under large loads applied to the reel body 1. The periphery of each connecting member 12 unitarily with the side plates 10 and 11 is machined likewise as with the first cover 13.

The fishing rod mount 4 is fixed to that connecting member 12 located at the bottom of the reel body 1. The fishing rod installation portion 4 is disposed so as to be parallel to the center position between the side plates 10 and 11 of the frame 5. The center position is also the center for the fishing-line reeling portion of the spool 15.

As shown in FIG. 1, the handle assembly 2 includes a crank arm 6 and a handle 7. The crank arm 6 is attached non-rotatably to an end of the handle shaft 30. The handle 7 is disposed at an end of the crank arm 6 to be rotatable about an axis crossing the end of the crank arm 6. The crank arm 6 is bent in the middle so that the handle 7 is positioned closer to the reel body 1.

As shown in FIG. 2, the spool 15 is rotatably disposed between the pair of side plates 10 and 11. The spool 15 includes a body portion 15a, and flange portions 15b, each of the flange portions being integrally formed with the body portion 15a and located on either side of the body portion 15a. A spool shaft 25 penetrates and is fixed into the center of the spool 15. The spool shaft 15 is rotatably supported by the first cover 13 and the mechanism fitting plate 16 via bearings 24a and 24b.

A rotation transmitting mechanism 20, a clutch mechanism 21, and a clutch operating mechanism 22 are disposed in the space between the mechanism fitting plate 16 and the second cover 14. The rotation transmitting mechanism 20 transmits torque from the handle assembly 2 to the spool 15. The clutch operation mechanism 22 turns on/off the clutch mechanism 21.

The rotation transmitting mechanism 20 includes a rotation controlling mechanism 23 for controlling torque, which is operated when torque is transmitted in reverse from the spool 15 to the handle assembly 2. A frictional braking mechanism 26 (an example of a first braking mechanism), a sounding mechanism 27, and a switching operation mechanism 28 are disposed between the side plate 10 and the first cover 13. The frictional braking mechanism 26 is capable of braking the spool 15 regardless of the state of the clutch mechanism 21. The sounding mechanism 27 produces a sound when the spool 15 is rotated. The switching operation mechanism 28 is capable of switching the frictional braking mechanism 26 and the sounding mechanism 27 at the same time.

The rotation transmitting mechanism 20 includes the handle shaft 30, a main gear 31, and a pinion gear 32. The handle assembly 2 is fixed to one end of the handle shaft 30. The main gear 31 is coupled to the other end of the handle shaft 30 via the rotation controlling mechanism 23. The pinion gear 32 is engaged with the main gear 31.

The handle shaft 30 is disposed parallel to the spool shaft 25 and one end of the handle shaft 30 is rotatably supported by the mechanism fitting plate 16. The main gear 31 is fitted to be rotatable with respect to the handle shaft 30 and via the rotation controlling mechanism 23 can couple with, to be non-rotatable relative to, one end of the handle shaft 30. In this configuration, when the clutch mechanism 21 is turned on, torque from the handle assembly 2 is directly transmitted to the spool 15 via the main gear 31 and the pinion gear 32.

The clutch mechanism 21 includes the pinion gear 32, an engaging groove 32a, and a pin 33. The pinion gear 32 is tubular and is slidably fitted to the outer periphery of the spool shaft 25. The engaging groove 32a is formed on a part of the pinion gear 32. The pin 33 is disposed in the spool shaft 25. Rotational force is transmitted between the spool shaft 25 and the pinion gear 32 when the pin 33 is engaged with the engaging groove 32a by sliding the pinion gear 32 against the spool shaft 25. This situation is the coupled (or clutch-on) state. When the pin 33 is disengaged from the engaging groove 32a, no rotational force is transmitted between the spool shaft 25 and the pinion gear 32. This situation is the uncoupled (or clutch-off) state. In the clutch-off state, the spool 15 rotates freely. The pinion gear 32 is urged by the clutch operation mechanism 22 in the direction in which the pin 33 engages with the engaging groove 32a, i.e., into the clutch-on state. The clutch operation mechanism 22 is furnished with a clutch lever 35 fitted to the second cover 14 of the reel body 1 wherein it is pivotable between the coupled state and the uncoupled state.

The rotation controlling mechanism 23 includes a one-way clutch mechanism 40, a drag mechanism 42, and a ratchet mechanism 44. The one-way clutch mechanism 40 is a roller-type and allows the handle shaft 30 to rotate only in the fishing line reeling-in direction (i.e., preventing the handle shaft 30 from rotating in the line-releasing direction). The drag mechanism 42 (one example of a second braking mechanism) exerts a predetermined drag force on the spool 15 rotating in the line releasing direction. The ratchet mechanism is a pawl-type and allows the handle shaft 30 to rotate only in the line reeling-in direction.

It is possible to use only the ratchet mechanism 44 and omit the use of the one-way clutch mechanism 40 if it is only desired to prohibit the handle shaft 30 from rotating in the reverse direction (i.e., in the line-releasing direction). However, the ratchet mechanism 44 requires a certain amount of time to engage/disengage the ratchet pawl with/from a ratchet wheel. Thus, in order to achieve quick and smooth fishing operation by prohibiting reverse rotation, the use of the above-mentioned roller type one-way clutch mechanism 40 is preferable. It is effective to use the ratchet mechanism 44 for bearing an excessive load not manageable by the one-way clutch mechanism 40.

The drag mechanism 42 allows adjusting drag force when operating the star drag 3 engaged with the handle shaft 30 to turn on the clutch. The drag mechanism 42 includes the main gear 31, a disk member 45, and a plurality of drag disks 46. The disk member 45 is disposed adjacent to the one-way clutch mechanism 40. The plurality of drag disks 46 are disposed between the main gear 31 and the disk member 45. The disk member 45 is non-rotatably fitted to an inner ring of the one-way clutch mechanism 40 so as not to rotate in the line-releasing direction. The drag mechanism 42 exerts a drag force on the spool 15 via the main gear 31 by pressing the main gear 31 against the disk member 45 via the plurality of drag disks 46.

Figure 3:
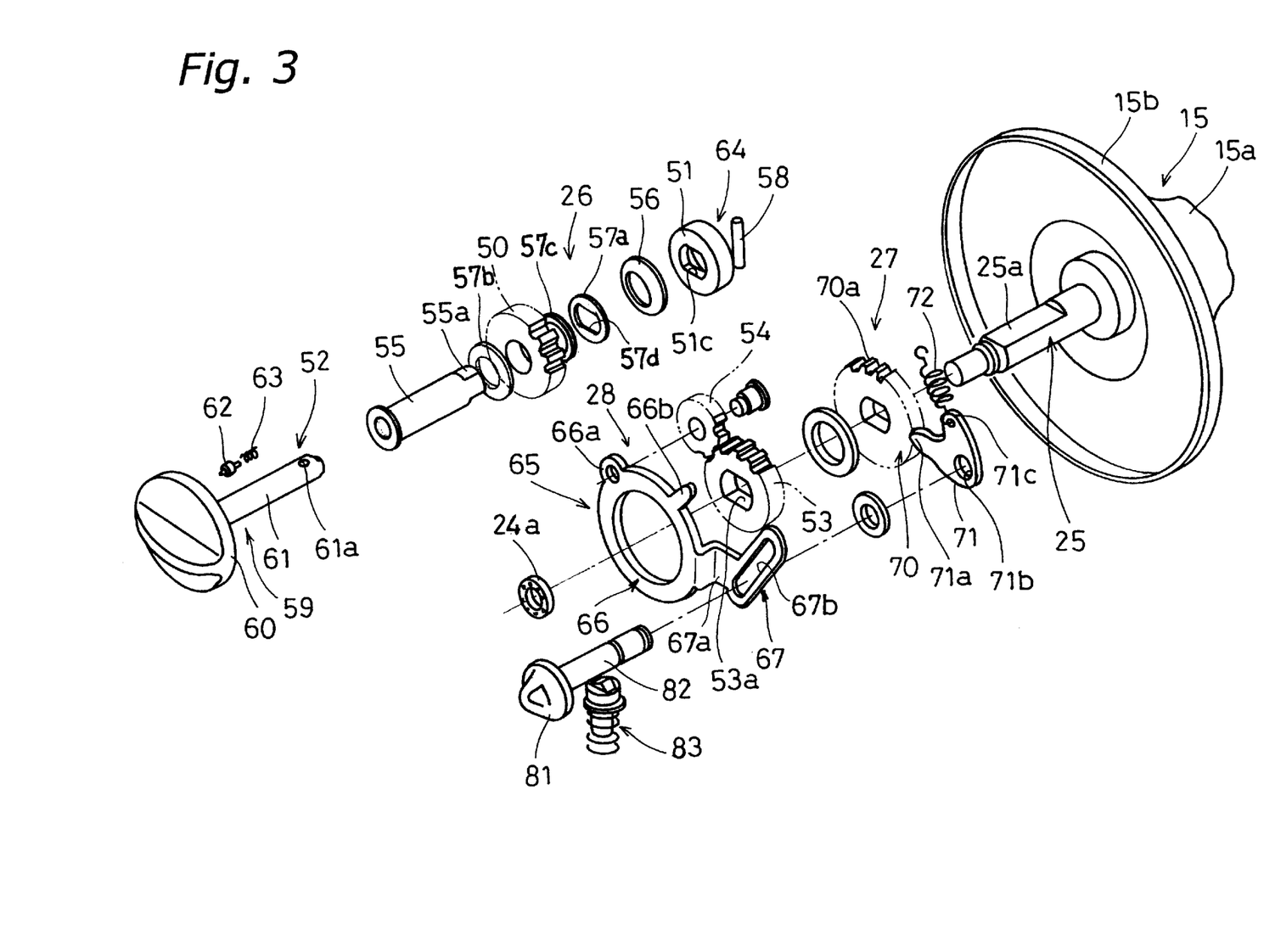
FIG. 3 is an exploded oblique view of the mechanisms situated on the operationally left-hand side of the reel.
Figure 4:
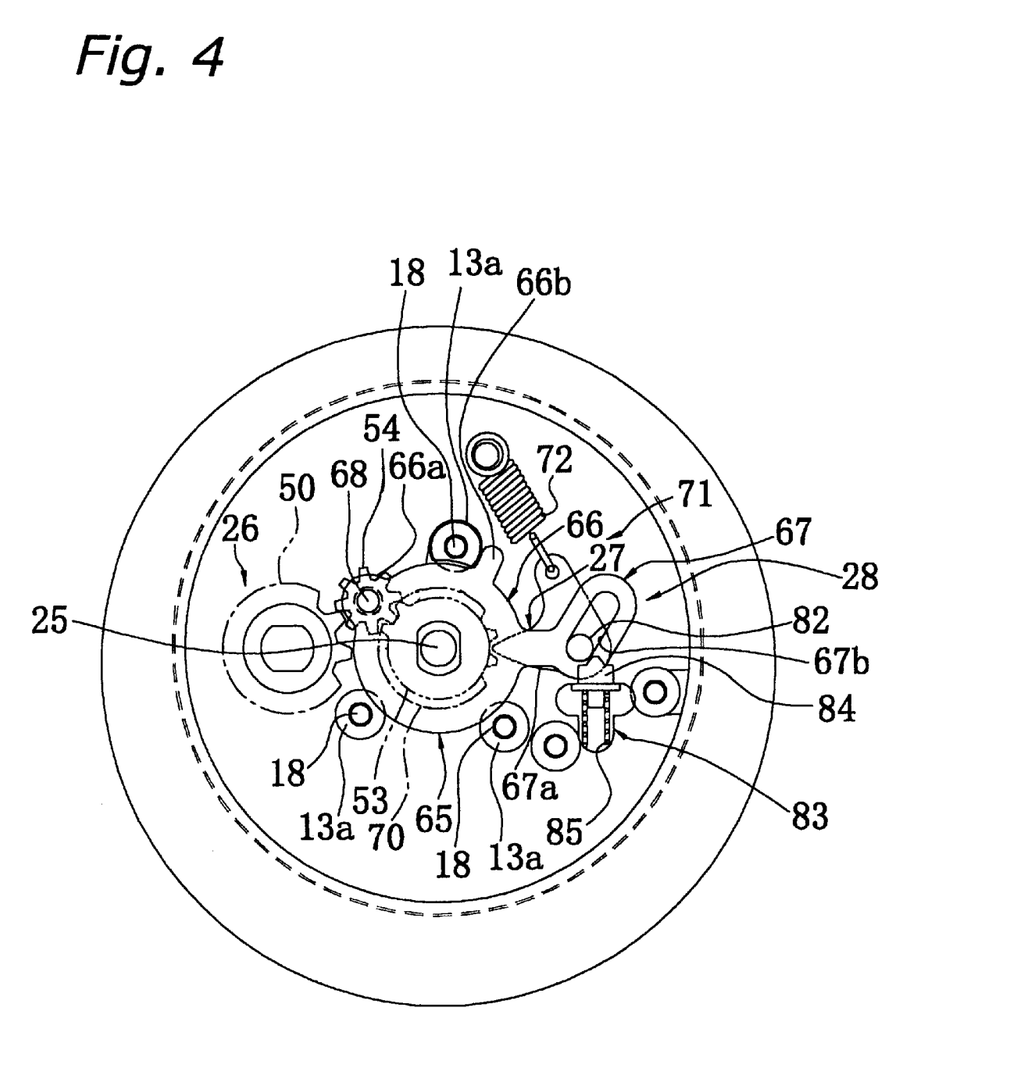
FIG. 4 is a section view of a lateral face inside the left-hand end of the reel, wherein a handling member thereof is located in an operative position.
Figure 5:
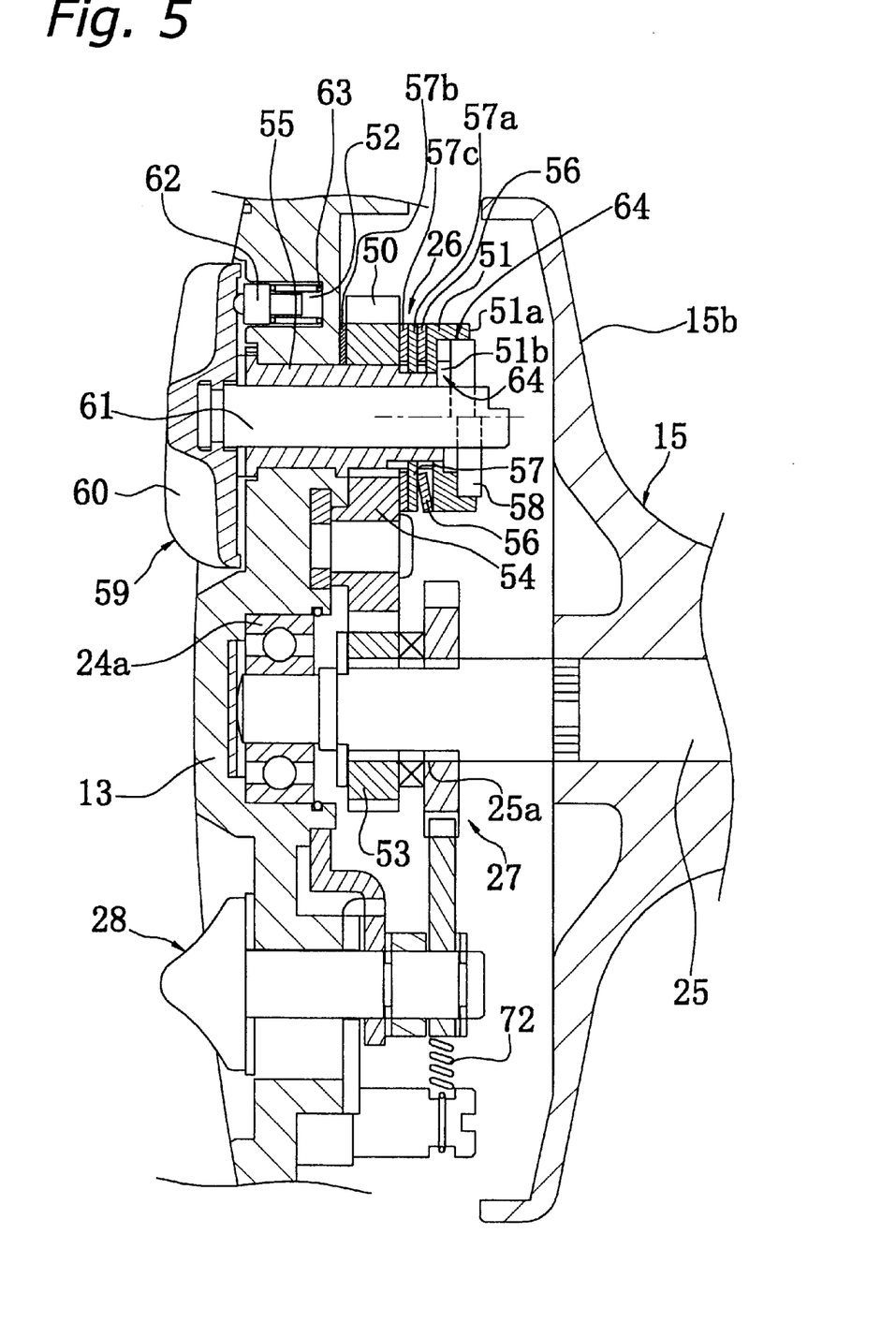
FIG. 5 is an enlarged fragmentary section view of the left-hand end of the reel corresponding to FIG. 2.

The frictional braking mechanism 26 is capable of braking the spool 15 regardless of the state of the clutch mechanism 21 and may be switched between a braking state and a non-braking state. As shown in FIG. 3 through 5, the frictional braking mechanism 26 includes a first gear 50, a pressing member 51, three braking disks 57a to 57c, a braking adjustment mechanism 52, a second gear 53, and a coupling gear 54. The first gear 50 (an example of a first rotation member) is rotatably provided on the first cover 13 of the reel body 1. The pressing member 51 is for compressing the first gear 50. The three braking disks 57a to 57c are disposed flanking the first gear 50. The braking adjustment mechanism 52 is capable of adjusting the compressing state of the pressing member 51. The second gear 53 (an example of a second rotation member) rotates together with the spool 15. The coupling gear 54 may transmit the rotation of the second gear 53 to the first gear 50.

The first gear 50 is a gear member having teeth on its outer surface and rotatably supported by the outer surface of a supporting shaft 55 having a cylindrical shape with a brim at its end, which is inserted in the first cover 13. The braking disks 57a and 57c are provided between the pressing member 51 and an intervening a disc spring 56, and the first gear 50. The braking disk 57b is provided between the first gear 50 and the first cover 13. The braking disk 57a is a ring shaped member made of stainless steel which is disposed at an end of the supporting shaft 55 axially movably in a non-rotatable manner. Each of the braking disks 57b and 57c is an annular member made of a synthetic resin (polymer) and disposed at a respective side of the first gear 50, to be non-rotatable manner with respect to the supporting shaft 55. The pressing member 51 is non-rotatably disposed at an end of the supporting shaft 55 to be axially movable and has a sloped cam surface 51b having a trimmed portion 51a on its outer periphery as shown in the right hand side of FIG. 5. The disc spring 56 is a structural element of the braking adjustment mechanism 52 and transmits pressing force to the first gear 50 via the braking disks 57a and 57c when the pressing member 51 moves toward the first gear 50. Also, the disc spring 56 moves the pressing member 51 in a direction away from the first gear 50 when the pressing force is loosened. It is possible to use a flat spring or a coiled spring instead of the disc spring 56.

A pair of chamfered portions 55a, formed parallel to each other, for non-rotatably supporting the pressing member 51 and the braking disk 57a, is provided at the end of the supporting shaft 55 having a cylindrical shape with a brim. The pressing member 51 and the braking disk 57a have a hole 51c and 57d, respectively, formed at the center portion thereof so that they may be supported by the chamfered portions 55a.

The braking adjustment mechanism 52 includes an adjustment member 59, a cam mechanism 64, and the disc spring 56. The adjustment member 59 is rotatably supported on the first cover 13. The cam mechanism 64 converts the rotation of the adjustment member 59 to reciprocating movement around its axis. The adjustment member 59 includes a knob 60 and a shaft portion 61. The knob 60 is provided for adjusting the braking force, and the shaft portion 61 is integrally formed with the knob 60 by insert molding. A pinhole 61a is formed radially into the end of the shaft portion 61. A cam pin 58 is inserted in the pinhole 61a. The cam pin 58 is disposed on the inner peripheral side of the trimmed portion 51a of the pressing member 51 and makes contact with the sloped cam surface 51b. The cam pin 58 and the sloped cam surface 51b constitute the cam mechanism 64.

When the knob 60 is rotated, the cam mechanism 64 moves the pressing member 51 to the left hand side of FIG. 5 and increases the braking force. When the knob 60 is rotated in the other direction, the disc spring 56 moves the pressing member 51 to the right hand side of FIG. 5 and decreases the braking force. Also, the disc spring 56 functions to smoothly transmit the pressing force of the pressing member 51 to the first gear 50. The cam pin 58 is rotated by the rotation of the knob 60 and engaged with the sloped cam surface 51b to press the pressing member 51 in a direction approaching the first gear 50. Note that the sounding mechanism 27 having a sounding pin 62 and a coiled spring 63, which may produces sound when the knob 60 rotates, is provided with the knob 60.

It is possible to restrict the pressing force by using the above-mentioned cam mechanism 64 so that the frictional braking mechanism 26 is less subject to damage. Further, by inserting the cam pin 58 after the cam mechanism 64 is loosened, assembling the cam mechanism 64 is facilitated since the cam pin 58 is disposed at the inner peripheral side of the sloped cam surface 51b.

In the braking adjustment mechanism 52, the portion of the sloped cam surface 51b with which the cam pin 58 makes contact is changed in accordance with the degree of rotation of the knob 60, and the position of the pressing member 51 having the sloped cam surface 51b with respect to the axial direction is varied accordingly. Due to these changes, the pressing force applied to the first gear 50, which is supported by the braking disks 57b and 57c, is changed and the braking force applied to the spool 15 via the coupling gear 54, the second gear 53, and the spool shaft 25 is varied.

The second gear 53 is a gear member having teeth on its outer surface. The second gear 53 is non-rotatably fixed to the spool shaft 25 inward with respect to the bearings 24a. The spool shaft 25 has a pair of chamfered portions 25a formed parallel to each other at the inner side thereof relative to its left end, to which the bearing 24a is attached as shown in FIG. 3. The second gear 53 has a hole 53a at its center portion for engaging with the chamfered portions 25a of the spool 25.

The coupling gear 54 has teeth on its outer surface that may be engaged with the first gear 50 and the second gear 53. The coupling gear 54 is always engaged with the second gear 53. The coupling gear 54, which is a part of the switching operation mechanism 28, is rotatably attached to a converting plate 65. The converting plate 65 is disposed on the inner side of the first cover 13 to be rotatable around the spool shaft 25. The coupling gear 54 is rotatable by the rotation of the switching plate 65. The rotation of the coupling gear 54 is limited to the range between a coupled position where it is engaged with the first gear 50 and an uncoupled position where it is disengaged from the first gear 50.

The sounding mechanism 27 is capable of producing sound in accordance with the rotation of the spool 15 and may be switched over from an engaged state in which sound is generated to a disengaged state in which no sound is generated or vice versa. The sounding mechanism 27 includes a jagged member 70 and a sounding member 71. The jagged member 70 has a ring shape and is fixed to the spool shaft 25 in a non-rotatable manner. The sounding member 71 is disposed so as to be capable of making contact with the outer periphery of the jagged member 70 and vibrates when the jagged member 70 is rotated. The jagged member 70 includes a plurality of projections 70a disposed circumferentially spaced on the outer periphery of the jagged member 70.

The sounding member 71 is formed as a curved plate element having an end portion 71a which may be placed between the projections 70a of the jagged member 70. A circular hole 71b is formed at the curved portion of the sounding member 71. A handling member 80 of the switching operation mechanism 28, which moves back and forth, penetrates the circular hole 71b and the sounding member 71 is movably supported by the handling member 80. The sounding member 71 may be moved, by the movement of the handling member 80 in the back and forth direction, from a sounding position where its end portion 71a is disposed between the projections 70a of the jagged member 70 to a disengaged position where the end portion 71a is disengaged from the projections 70a. When it is placed at the sounding position, the sounding member 71 produces sound by repeatedly colliding with the projections 70a of the rotating jagged member 70. One end of a coiled spring 72 is engaged with a base end portion 71c extending from a curved part of the sounding member 71. The other end of the coiled spring 72 is engaged with the first cover 13. The sounding member 71 is maintained at the sounding position by the coiled spring 72, at which the end portion 71a of the sounding member 71 is disposed between the projections 70a. In other words, the position of the sounding member 71 is maintained so that a straight line connecting the end portion 71a of the sounding member 71 with a central axis of the handling member 80 crosses the center of the spool shaft at substantially a right angle when the coiled spring 72 is in its free state. Also, the coiled spring 72 is disposed so as to urge the converting plate 65 towards the coupled position side from the sounding member 71 via the handling member 80.

Figure 7:
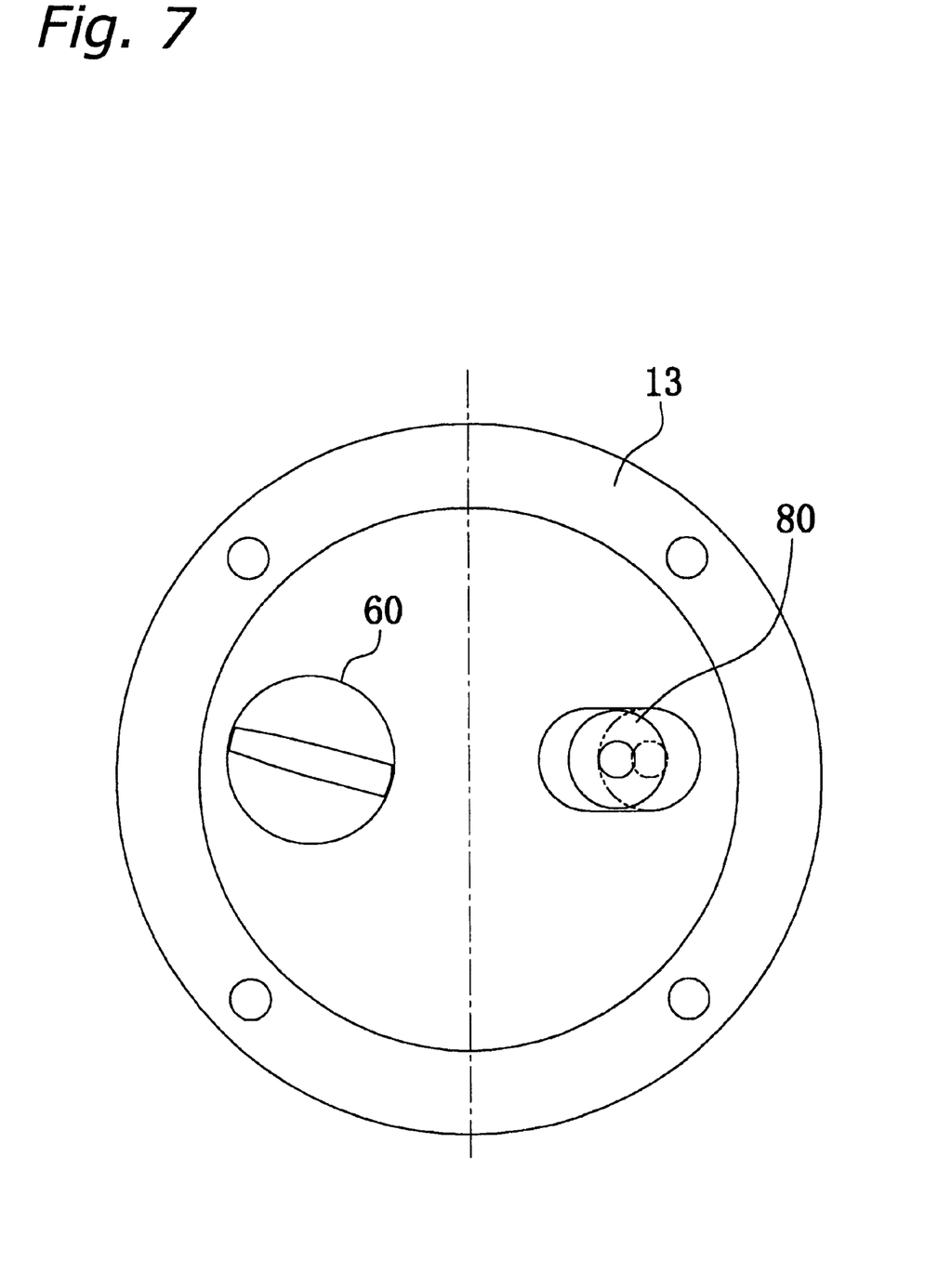
FIG. 7 is a lateral view of the exterior of the left-hand end of the reel.

The switching operation mechanism 28 includes the handling member 80 and the converting plate 65. The handling member 80 may be moved in a back and forward direction and the converting plate 65 rotates in accordance with the back and forth movement of the handling member 80. The handling member 80 is movably supported by the first cover 13 and may be moved from an operative position located at the front, indicated by a solid line in FIG. 7, to an inoperative position located at the back, indicated by a dotted line in FIG. 7. The handling member 80 includes a knob 81 and a shaft portion 82. The knob 81 is used for the handling operation and has a relatively large diameter. The shaft portion 82 is integrally formed with the knob 81 and supported by the first cover 13 in a movable manner in a back and forth direction. The sounding member 71 is movably supported by the shaft portion 82 and the sounding mechanism 27 may produce sound when the handling member 80 is placed at the operative position. The shaft portion 82 is maintained at the operative position or the inoperative position by a toggle mechanism 83. The toggle mechanism 83 includes a retainer 84 and a coiled spring 85. The retainer 84 is disposed between the operative position and the inoperative position and the coiled spring 85 urges the retainer 84 in an upward direction in FIG. 4. The retainer 84 is a rod-type member having a peaked end and, when the handling member 80 is being moved, moves downwardly if the shaft portion 82 makes contact with the retainer 84. After the shaft portion 82 passes over, the retainer 84 moves upward and holds the shaft portion 82 at a predetermined position.

The converting plate 65 has a rotative portion 66 and a converter 67. The rotative portion 66 is annular and the converter 67 projects radially and tangentially from the outer periphery of the rotating portion 66, as shown in FIG. 3 and 4. The converting plate 65 is pivotable between the coupled position shown in FIG. 4 and the uncoupled position shown in FIG. 6. The coupling gear 54 is moved from the coupled position to the uncoupled position or vice versa by this rotation of the converting plate 65.

The rotating portion 66 is rotatably disposed at the inner side of the first cover 13 but is prevented from moving axially by the heads of three machine screws 18, each of which is inserted in a respective protruding portion 13a projecting inwardly from the first cover 13. The rotating portion 66 has a gear supporting part 66a and a stopper part 66b as a converting plate 65 regulating means. An end of rotary shaft 68 is fixed to the gear supporting part 66a and the coupling gear 54 is rotatably fixed to the rotary shaft 68. The stopper part 66b is a projection that is engaged with one of the protruding portions 13a when the coupling gear 54 is placed at the coupled position in which it is engaged with the first gear 54. The function of the stopper part 66b is to prevent further rotation of the converting plate 65 in the counterclockwise direction in FIG. 4. This accordingly prevents over-engagement of the coupling gear 54 with the first gear 50 when the coupling gear 54 is placed at the coupled position and, hence, a less force is required for moving the handling member 80 to the inoperative position.

The function of the converter 67 is to convert the back-and-forth movement of the handling member 80 to rotary movement of the rotative portion 66. The converter 67 has a connecting part 67a projecting radially from the rotating portion 66 and a guiding part 67c extending obliquely upwardly in FIG. 4 from the connecting part 67a. An obliquely oriented, elliptical guiding groove 67b is provided in the guiding part 67c, and the shaft portion 82 of the handling member 80 penetrates the guiding groove 67b. When the handling member 80 is moved between the operative position shown in FIG. 4 and the inoperative position shown in FIG. 6, the converting portion 67 rotates the rotating portion 66 between the coupled position and the uncoupled position. That is, when the handling member 80 is moved from the operative position to the inoperative position, the rotating portion 66 rotates from the coupled position to the uncoupled position and when the handling member 80 is moved from the inoperative position to the operative position, the rotating portion 66 rotates from the uncoupled position to the coupled position. In this manner, the frictional braking mechanism 26 and the sounding mechanism 27 may be switched from the braking state and the engaged state, respectively, to the non-braking state and the disengaged state, respectively, at the same time by operating the handling member 80.

Next, the use of the reel will be explained.

When drifting live bait, the drag force of the drag mechanism 42 is set to be a stronger value by rotating the star drag 3 in order to prevent the fishing line from being released by the live bait. Also, the braking force of the frictional braking mechanism 26 is set to be a weaker value than the drag force of the drag mechanism 42 depending on the a tug on the line by the live bait.

When the drag force is adjusted, a spring balance or a weight having substantially the same weight as that of an objective fish is connected to an end of the fishing line in the turn-on state of the clutch mechanism 21. Then, the connected spring balance or the weight is pulled and the star drag 3 is rotated so that a desired drag force may be obtained.

When the braking force of the frictional braking mechanism 26 is adjusted, a spring balance or a weight having substantially the same weight as that of live bait is connected to an end of the fishing line in the turn-off state of the clutch mechanism 21. The handling member 80 is positioned at the operative position. Then, the connected spring balance or the weight is pulled and the knob 60 is rotated so that a desired braking force may be obtained. When the knob 60 is rotated, the portion of the sloped cam surface 51b with which the cam pin 58 makes contact is changed in accordance with the degree of rotation of the knob 60, and the position of the pressing member 51 having the sloped cam surface 51b with respect to an axial direction is varied accordingly. Due to these changes, the pressing force applied to the first gear 50 is changed and the braking force applied to the spool 15 via the coupling gear 54, the second gear 53, and the spool shaft 25 is varied.

Figure 6:
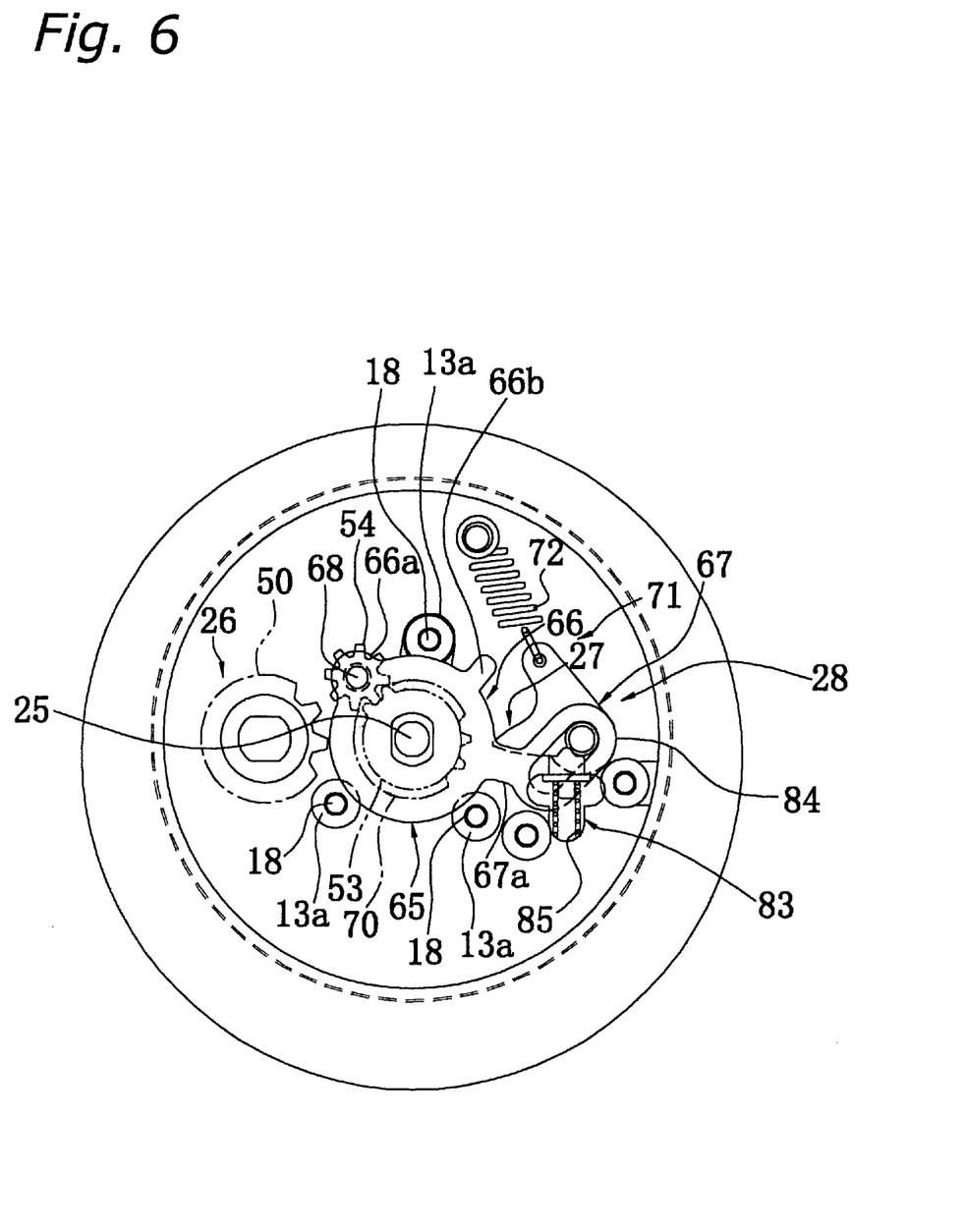
FIG. 6 is a section view of the reel lateral face depicted in FIG. 4, wherein the handling member is located in an inoperative position.

When the fishing line is released, the clutch mechanism 21 is turned off using the clutch lever 45 and the handling member 80 is switched to the inoperative position. When the handling member 80 is positioned at the inoperative position, the sounding member 71 is disengaged from the jagged member 70 and the sounding mechanism enters the disengaged state as shown in FIG. 6. At the same time, the rotating portion 66 is rotated from the coupled position to the uncoupled position placing the coupling gear 54 at the disengaged position so that the frictional braking mechanism 26 enters the non-braking state. Accordingly, the spool 15 enters a free rotation state and rotates in the line releasing direction by the weight of the bait rig causing the fishing line to be released from the spool 15.

When wait for a tug on the line after setting the bait rig at a desired position, the handling member 80 is positioned at the operative position. When the handling member 80 is placed at the operative position, the sounding member 71 makes contact with the jagged member 70 and the sounding mechanism 27 enters the engaged state as shown in FIG. 4. At the same time, the rotating portion 66 is rotated from the uncoupled position to the coupled position placing the coupling gear 54 at the coupled position to be engaged with the first gear 50 so that the frictional braking mechanism 26 enters the braking state. As a result, the spool 15 is braked by the frictional braking mechanism 26 and the releasing of the fishing line is stopped. A fisherman can wait for a tug on the line keeping this state. During this time, if the live bait swim, the spool 15 is slightly rotated in the line releasing direction causing the sounding mechanism 27 to produce a small sound with a long interval.

When a fish is caught, the spool 15 is rotated in the line releasing direction and the sounding mechanism 27 generates a large sound with a short interval. The fisherman may operate the clutch lever 35 to turn on the clutch mechanism 28 and the drag mechanism 42. After the fish is hooked, he/she may place the handling member 80 at the inoperative position in order to decrease the rotational resistance during a reeling-in process and reels in the fish by rotating the spool 15 in the line reeling-in direction using the handle assembly 2.

In this embodiment, the frictional braking mechanism 26 and the sounding mechanism 27 are switched to the inoperative state at the same time when the handling member 80 is placed at the inoperative position. For this reason, it is easy to carry out the switching operation of the frictional braking mechanism 27 or the sound indicator mechanism 27 after the fish is hooked. Also, when the handling member 80 is positioned at the operative position, the frictional braking mechanism 26 and the sounding mechanism 27 are switched to the operative state, respectively, at the same time. Accordingly, it becomes easy to carry out the switching operations when the bait rig is cast.

OTHER EMBODIMENTS (a) Although the spool 15 is indirectly braked by braking the first gear 50 connected with the spool 15 in the frictional braking mechanism 26 in the above-mentioned embodiment, the configuration of he frictional braking mechanism 26 is not limited as such. For instance, it is possible to directly brake the spool 15 or the spool shaft 25. In such a case, the position of the pressing member pressing the spool 15 or the spool shaft 25 may be switched between a position where it presses the spool 15 or the spool shaft 25 and a position where it is placed away from the spool 15 or the spool shaft 25. Also, the first braking mechanism is not limited to the one utilizing friction in order to achieve braking and braking mechanisms utilizing induced electromagnetic force or viscosity of a fluid may be used.

(b) Although the sounding mechanism 27 produces sound when it makes contact with the convex portions provided with the spool shaft 25 in the above-mentioned embodiment, the configuration of the sounding mechanism 27 is not limited as such. For example, it is possible that the sounding member be directly contacted the spool 15 to produce sound. In such a case, the position of the sounding member may be switched from a position at which it makes contact with the spool 15 to a position it is placed away from the spool.

(c) Although the coupling gear 54 is urged towards the coupled position using the coiled spring 72 in the above-mentioned embodiment, the coupling gear 54 or the switch-over plate 65 may be directly urged using another urging member other than the coiled spring 72.

(d) Although the coupling gear 54 is urged towards the coupled position in the above-mentioned embodiment, the coupling gear 54 may not be urged. In such a case, the coupling gear 54 is urged towards the coupled position by the second gear 53 to be coupled with the frictional braking mechanism 26 (the first braking mechanism) when the fishing line is released. The coupling gear 54 is urged towards the opposite direction so that not braking force is applied when the line is reeled in. For this reason, it is not necessary to operate the handling member 80 when reeling in the line. Accordingly, the handling member 80 needs to be switched to the inoperative position only when casting a bait rig and the operative position only when waiting for a tug on the line.

Also, it is possible to use a one-way clutch so that a braking force is applied to only the rotation in the line releasing direction in order to obtain similar effect.

According to the present invention, since the first braking mechanism and the sounding mechanism may be switched at the same time using the switching operation mechanism, switching operations of a reel necessary for fishing becomes easier as compared with reels in which the first braking mechanism and the sounding mechanism are operated separately.

Various details of the present invention may be changed without departing from its spirit nor its scope. Furthermore, the foregoing description of the embodiments according to the present invention is provided for illustration only, and not for the purpose of limiting the invention as defined by the appended claims and their equivalents.

What is claimed is:

1. A double bearing reel for fitting to a fishing rod, wherein fishing line is reeled in on an axis transverse to the fishing rod longitudinally, comprising:

a reel body for fitting to the fishing rod, said reel body having a handle;

a spool rotatably fitted to said reel body;

a clutch mechanism switchable between a transmit state for transmitting, and a cutoff state for cutting off, rotation of said handle to said spool;

a first braking mechanism switchable regardless of the state of said clutch mechanism between a braking-activated state allowing said first braking mechanism to brake said spool, and a braking-deactivated state;

a sounding mechanism switchable between a sounding-activated state allowing said sounding mechanism to sound in response to rotation of said spool, and a sounding-deactivated state; and a switching operation mechanism for simultaneously switching said sounding mechanism and said first braking mechanism between the sounding-activated, braking-activated state, and the sounding-deactivated, braking-deactivated state.

2. A double bearing reel as set forth in claim 1, said first braking mechanism having a braking adjustment mechanism enabling adjustment of braking force on said spool.

3. A double bearing reel as set forth in claim 2, said first braking mechanism having:

a first rotation member rotatably provided on said reel body;

a pressing member for pressing said first rotation member;

a second rotation member for rotating cooperatively with said spool; and a coupling member shiftable into a coupled position for coupling to said first rotation member and said second rotation member, and a releasing position for releasing from at least one of said first and second rotation members, wherein placing said coupling member into the coupled position allows rotation of said second rotation member to be transmitted to said first rotation member; wherein said braking adjustment mechanism adjusts pressing status of said pressing member, and said switching mechanism shifts said coupling member into the coupled position and into the release position.

4. A double bearing reel as set forth in claim 3, wherein said second rotation member is a first gear non-rotatably fitted to a spindle for said spool;

said first rotation member is a second gear turning on an axis parallel to the spool spindle; and said coupling member is a gear engagable with said first and second gears.

5. A double bearing reel as set forth in claim 3, said braking adjustment mechanism having:

an adjusting member rotatably fitted onto said reel body on a shaft; and a cam mechanism provided for contacting said pressing member, and for reciprocating movement shaft-wise of said adjusting member by rotating cooperatively with said adjusting member; wherein said pressing member is disposed between said cam mechanism and said first rotation member, and compressing force of said pressing member on said first rotation member is varied by the reciprocating movement said cam mechanism.

6. A double bearing reel as set forth in claim 3, further comprising an urging means for urging said coupling member towards the coupled position.

7. A double bearing reel as set forth in claim 3, said sounding mechanism having:

a disk-shaped jagged member having a plurality of circumferentially spaced outer peripheral projections formed side by side, said jagged member rotating cooperatively with said spool; and a sounding member having an end portion disposed for movement into a sounding position wherein the end portion is in between the peripheral projections of said jagged member such that rotation of said jagged member vibrates said sounding member, and for movement into a separated position wherein the end portion is parted away from the peripheral projections; wherein said switching operation mechanism moves said sounding member between the sounding position and the separated position.

8. A double bearing reel as set forth in claim 7:

said jagged member being non-rotatably fitted to the spool spindle; and said switching operation mechanism having a handling member movably provided on said reel body for moving said sounding member between the sounding position and the separated position; and a converting member having a rotative portion for rotatably supporting said coupling member, and a converter portion formed integrally with said rotative portion for converting movement of said handling member to rotation about said spool spindle; wherein said sounding member moving into the sounding position rotates said converting member to move said coupling member into the coupled position, and said sounding member moving into the separated position reverse-rotates said converting member to move said coupling member into the releasing position.

9. A double bearing reel as set forth in claim 8:

said sounding member being movable in a radial direction with respect to said jagged member; and said handling member being provided on said reel body for movement in said radial direction; wherein said handling member moves said sounding member between the sounding position and the separated position, the separated position being shifted in said radial direction from the sounding position.

10. A double bearing reel as set forth in claim 8, wherein:

said sounding member is pivotably fitted to said handling member; and said urging means is a spring component for maintaining said sounding member in a predetermined pivotal position.

11. A double bearing reel as set forth in claim 8, further comprising:

a regulating means for regulating rotational position of said converting member in the coupled position.

12. A double bearing reel as set forth in claim 1, further comprising a second braking mechanism for braking rotation of said spool in its line reeling-out direction when said clutch mechanism is in the transmit state.

\* \* \* \* \*